(12) United States Patent
Gretz

(10) Patent No.: US 7,075,004 B1
(45) Date of Patent: Jul. 11, 2006

(54) INTEGRAL LOW VOLTAGE/HIGH VOLTAGE ELECTRICAL BOX

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/053,366

(22) Filed: Feb. 8, 2005

Related U.S. Application Data

(63) Continuation-in-part of application No. 10/456,027, filed on Jun. 7, 2003.

(51) Int. Cl.
*H02G 3/08* (2006.01)
(52) U.S. Cl. ............................. 174/50; 174/58; 174/63; 248/906; 439/535
(58) Field of Classification Search ................. 174/50, 174/58, 63, 53, 17 R; 220/4.02, 3.6, 3.8, 220/3.3; 248/906; 439/535
See application file for complete search history.

(56) References Cited

FOREIGN PATENT DOCUMENTS

EP    1156 566 A2  *  11/2001

* cited by examiner

*Primary Examiner*—Dhiru R. Patel

(57) ABSTRACT

An integral, one-piece low voltage/receptacle electrical outlet box includes an integral one-piece structure having a top, a bottom, opposing side walls and an internal, integral dividing wall defining low voltage and receptacle sides of the electrical box. Punchouts and apertures for the insertion of power and securing of electrical cables and the like are provided in the receptacle side and punchouts and/or openings are provided in the low voltage side for the insertion and securing of low voltage wiring/cables. Both a new construction and "old work" or retrofit version of such a device are described.

3 Claims, 7 Drawing Sheets

INTEGRAL LOW VOLTAGE/HIGH VOLTAGE ELECTRICAL BOX

This application is a continuation-in-part of U.S. patent application Ser. No. 10/456,027 filed Jun. 7, 2003 and copending herewith.

FIELD OF INVENTION

The present invention relates to electrical outlet boxes and more particularly to an integral combined low voltage/high voltage such box.

BACKGROUND OF THE INVENTION

The installation of low voltage wiring and the attendant connecting devices and outlets is becoming more common with the proliferation of computer equipment and various other low voltage environmental control devices and the like. Accordingly, it is not unusual for a building, commercial or residential, to have an almost equal number of low voltage and high voltage outlet boxes installed either during construction or remodeling or even as retrofit installations.

While a number of so-called "low voltage boxes" have been designed manufactured and are currently marketed and even some so-called combined structures that comprise a low voltage attachment means fastened in one fashion or another to a conventional high voltage electrical box have been designed manufactured and sold, no totally integral such device has been designed or marketed. The availability of such an integral device that incorporates the capabilities of both high voltage and low voltage connection would accordingly be valuable to the electrical installation and construction trades.

OBJECT OF THE INVENTION

It is therefore an object of the present invention to provide an integral, one-piece combined high and low voltage outlet box that permits simultaneous installation of both such services in a single opening.

SUMMARY OF THE INVENTION

According to the present invention, there is provided an integral, one-piece low voltage/receptacle electrical outlet box comprising an integral one-piece structure having a top, a bottom, opposing side walls and an internal, integral dividing wall defining low voltage and receptacle sides of the electrical box. Knockouts for the insertion of power and securing of electrical cables and the like are provided in the receptacle side and knockouts and openings are provided in the low voltage side for the insertion and securing of low voltage wiring/cables. Both a new construction and retrofit version of such a device are described and claimed herein.

DETAILED DESCRIPTION

Figure 1:
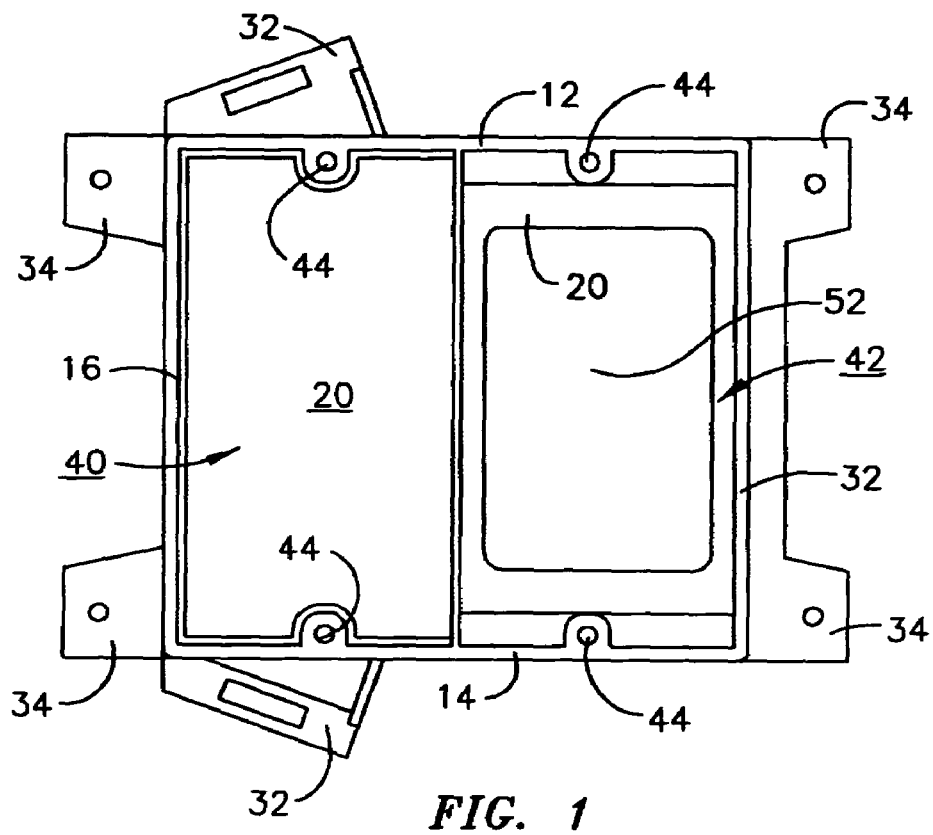
FIG. 1 is a front view of one embodiment of the integral one-piece combined receptacle/low voltage electrical box of the present invention.
Figure 2:
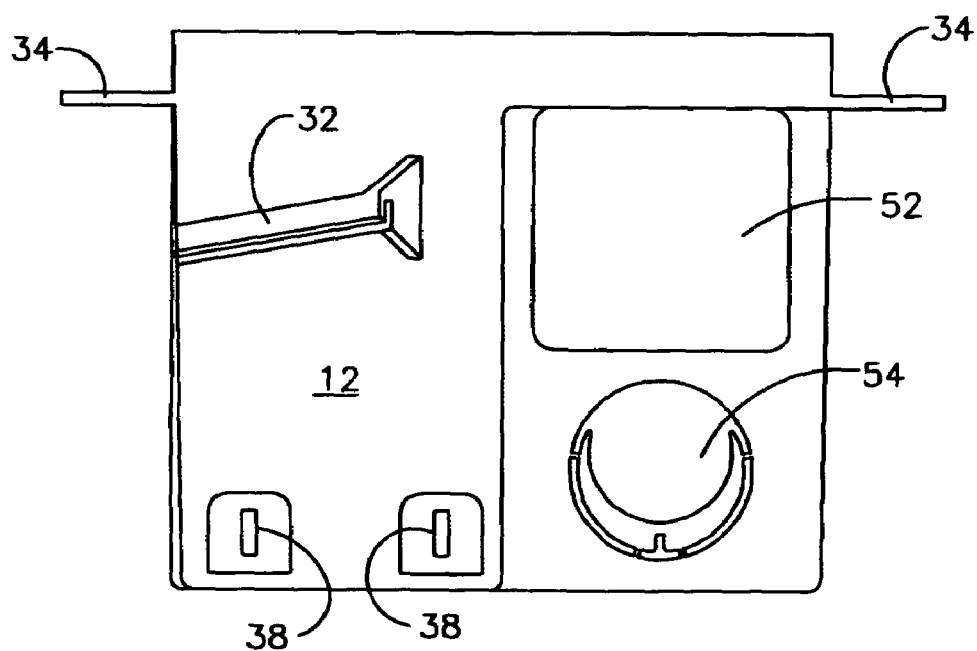
FIG. 2 is a top view of one embodiment of the integral one-piece combined receptacle/low voltage electrical box of the present invention.
Figure 3:
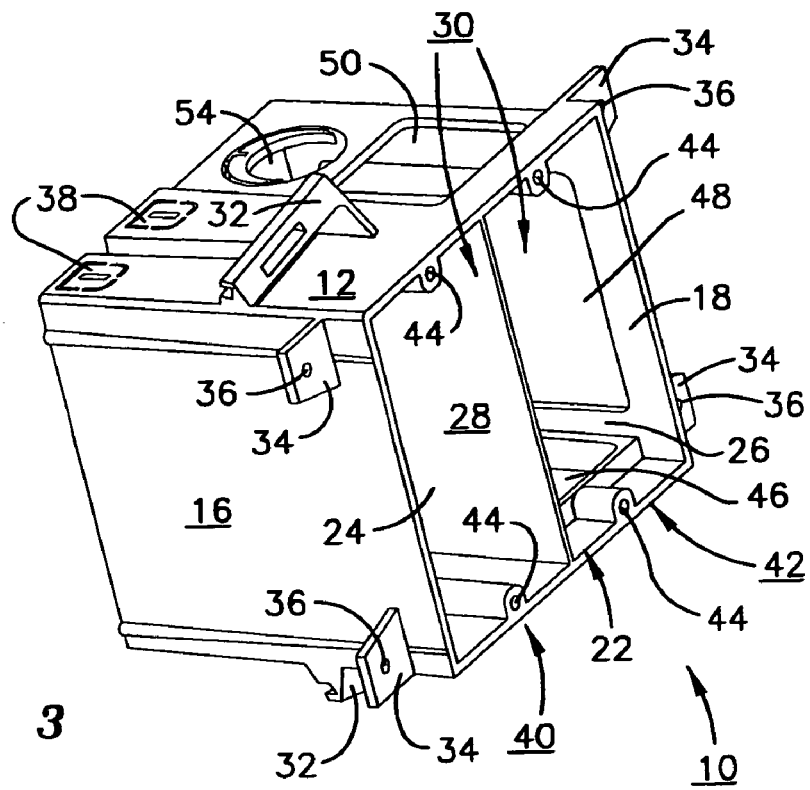
FIG. 3 is a front perspective view of one embodiment of the integral one-piece combined receptacle/low voltage electrical box of the present invention.
Figure 4:
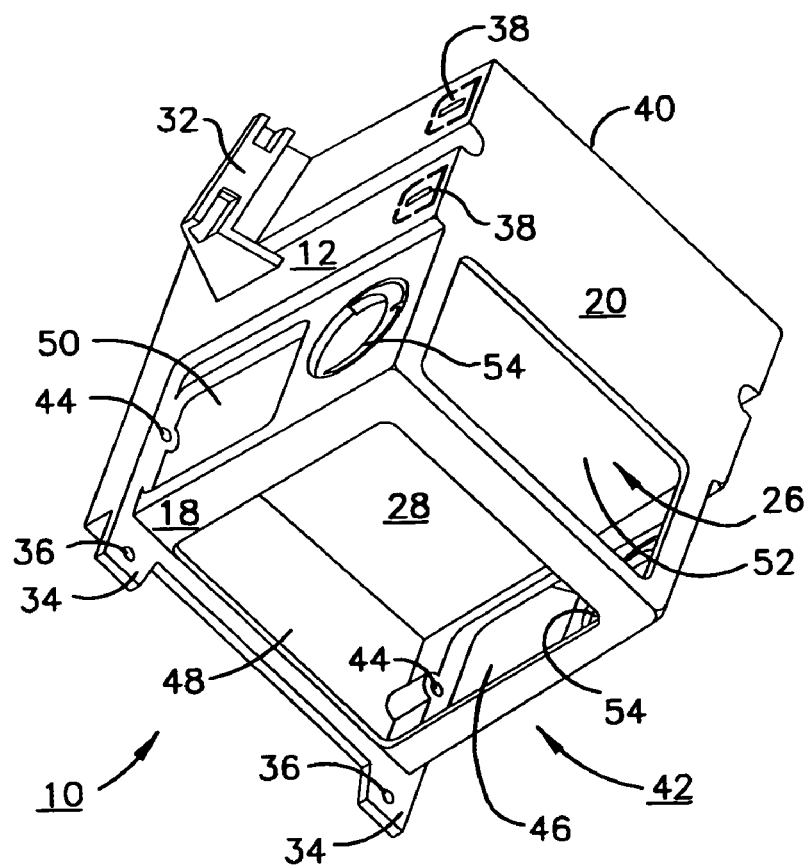
FIG. 4 is a rear perspective view of one embodiment of the integral one-piece combined receptacle/low voltage electrical box of the present invention.

Referring now to FIGS. 3 and 4, the integral one-piece combined receptacle/low voltage electrical box 10 of the present invention, hereinafter integral box 10, comprises a top 12, a bottom 14, opposing sides 16 and 18, a rear wall 20 and a front opening 22 all of which together serve to define a interior volume 30 having one side open at front opening 22. Interior volume 30 is divided into two separate volumes 24 and 26 by a wall 28 that extends, preferably from top 12 to bottom 14. As depicted in the attached Figures, interior volume 24 comprises the receptacle or conventional voltage box portion of integral box 10 and interior volume 26 comprises the low voltage box portion of integral box 10.

Integral box 10 is equipped with a variety of devices and apertures to permit attachment thereof to studs or other structural members in a building. These include nailing flanges 32 as well as nailing flanges 34, each of which includes a fastener aperture 36.

Referring now more specifically to interior volume 24 that defines the receptacle or high voltage electrical box portion 40 of integral box 10, this portion of integral box 10 is equipped with knockouts 38 in top 12 and bottom 14 (those in bottom 14 are not shown in the Figures) to allow for the insertion of electrical cabling or wiring. Electrical box portion 40, as well as low voltage box portion 42 defined by interior volume 26, are equipped with face plate fastener apertures or mounting blocks 44 to allow for the application of a conventional faceplate 55 over front opening 22 integral box 10 and the installation of low voltage and high voltage outlets 66 and 68 respectively shown most clearly in FIG. 6.

In the case of low voltage box portion 42, defined by interior volume 26, bottom 14, side 18, top 12 and rear wall 20 are all provided with apertures 46, 48, 50 and 52 respectively for the easy insertion of low voltage wiring such as generally does not require secure fastening to integral box 10 except as may be provided by attachment to a fitting mounted in an over-applied faceplate (not shown). Additionally, low voltage box portion 42 in top 12 and bottom 14 is equipped with punchouts or apertures 54 that are adapted to receive low voltage cable retention devices or fittings when such fittings are required or desired. It should be noted that apertures 52 and 48 preferably comprise a majority of the area of rear and side walls 20 and 18 respectively to provide maximum ready access to interior volume 26 during installation of low voltage cabling.

While the embodiment depicted in the various views presented in FIGS. 1–4 represent a preferred embodiment of the integral electrical box of the present invention, it will be obvious to the skilled artisan that a number of modifications can be made thereto without materially affecting the functionality of integral electrical box 10. For example, additional or fewer knockouts and punchouts can be provided. The relative sizes of apertures or openings 46, 48, 50 and 52 can be varied. While it is clearly desirable from a manufacturing point of view that wall 28 be located at or in the vicinity of the midpoints of top 12 and bottom 14, wall 28 can be located virtually at any point between these two elements so long as adequate space is provided on receptacle side 40 as to permit the insertion of a receptacle and its associated wiring.

Figure 5:
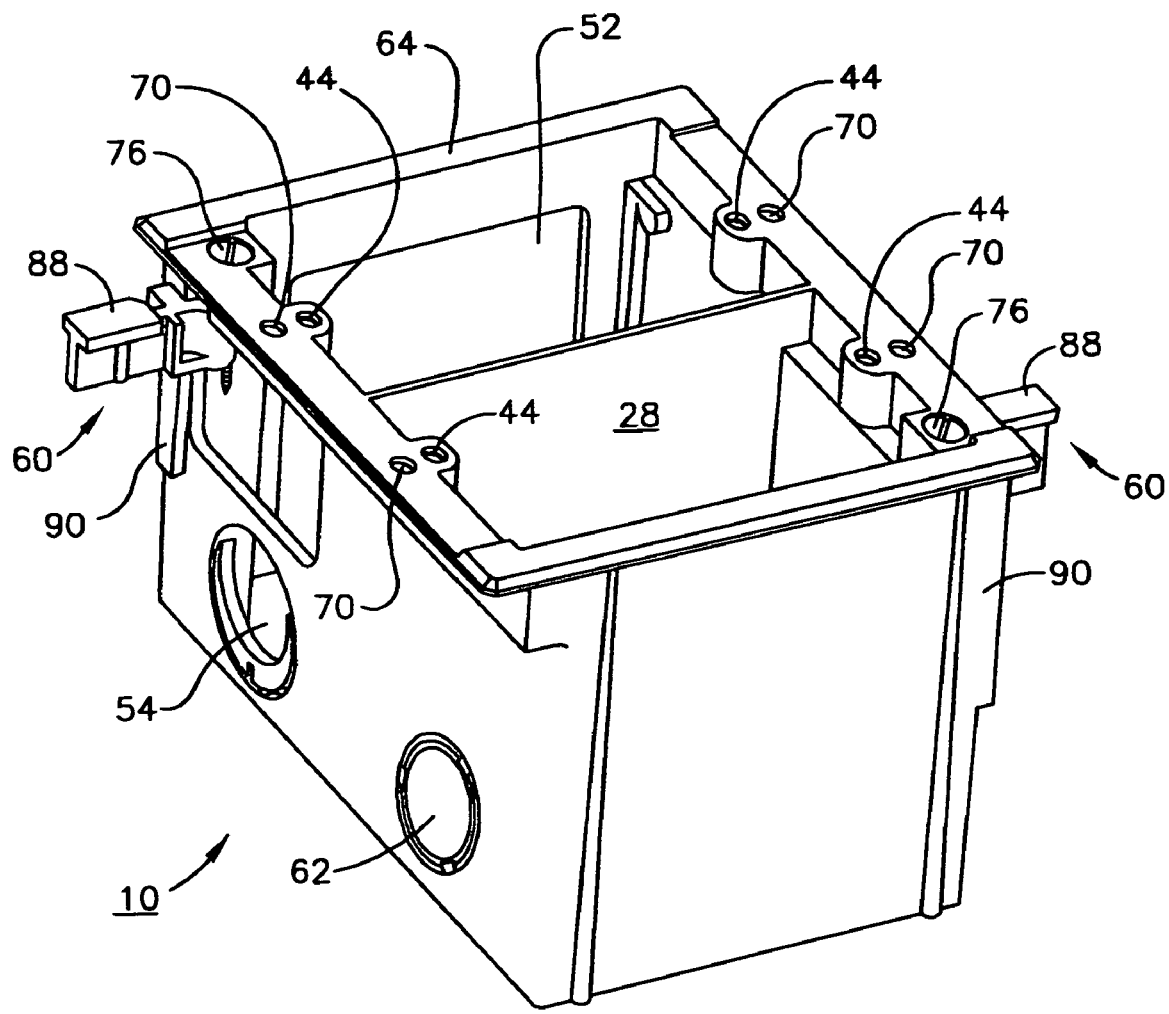
FIG. 5 is a perspective view of an alternate preferred embodiment of the electrical box of the present invention.

Depicted in FIGS. 5–9 is an alternative preferred embodiment of the integral electrical box of the present invention. Referring now to FIG. 5 that depicts a perspective view of the alternate preferred embodiment of integral box 10 of the present invention, integral box 10 is fundamentally of the same configuration as described hereinabove in connection with FIGS. 1–4 except that; 1) nailing flanges 32 and 34 shown in FIGS. 1–4 have been eliminated and flags 60 and mounting blocks 72 added; 2) knockouts 38 have been replaced by a single cable entry aperture 62; and 3) a peripheral flange 64 including faceplate screw mounting apertures 70 has been added about front opening 22. In this configuration, i.e., by virtue of the substitution of elements 60 and 64, integral box 10 is suitable for "old work" or retrofit applications.

Figure 6:
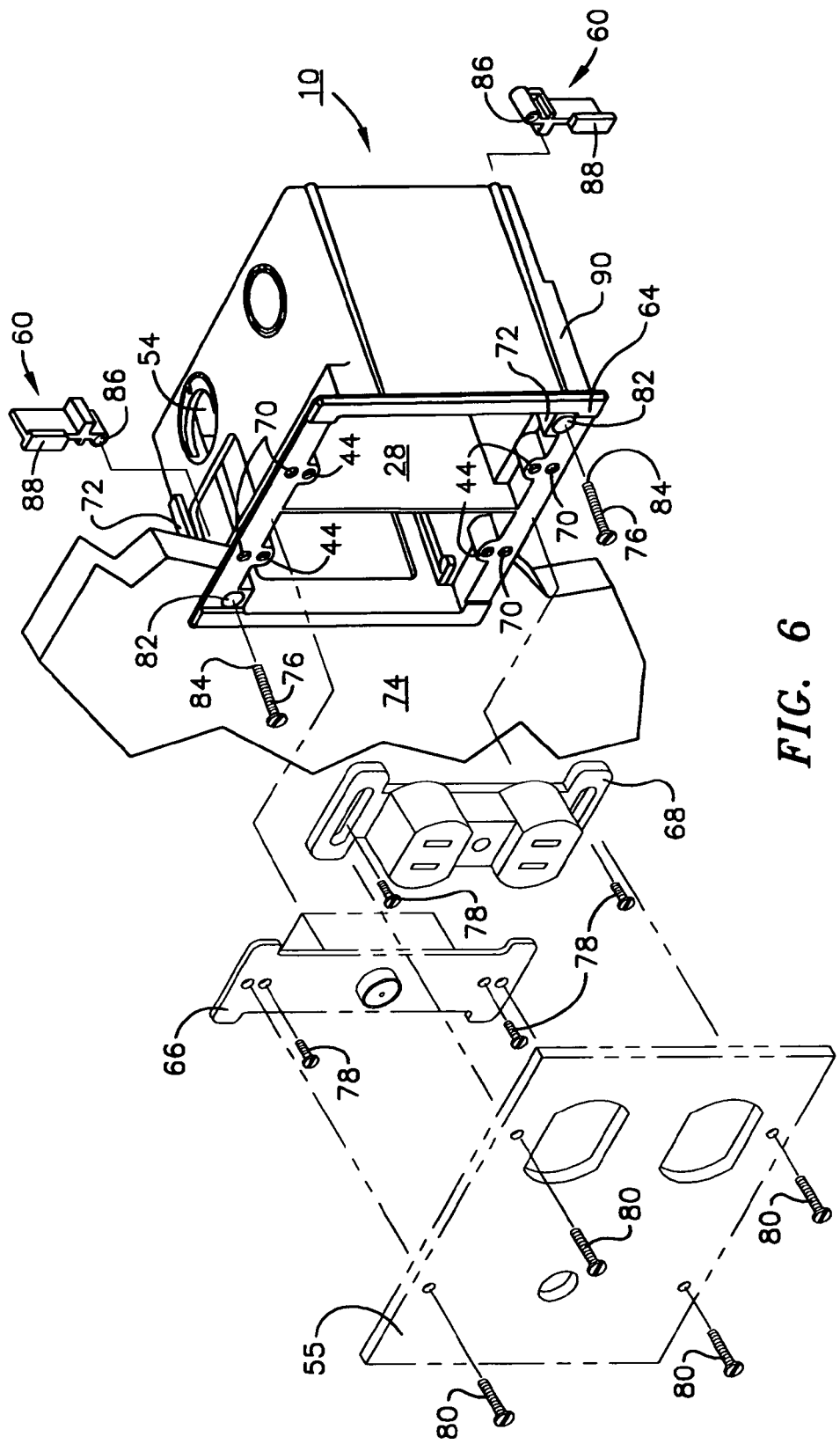
FIG. 6 is an exploded perspective view of the electrical box of FIG. 5 installed in a wall.
Figure 7:
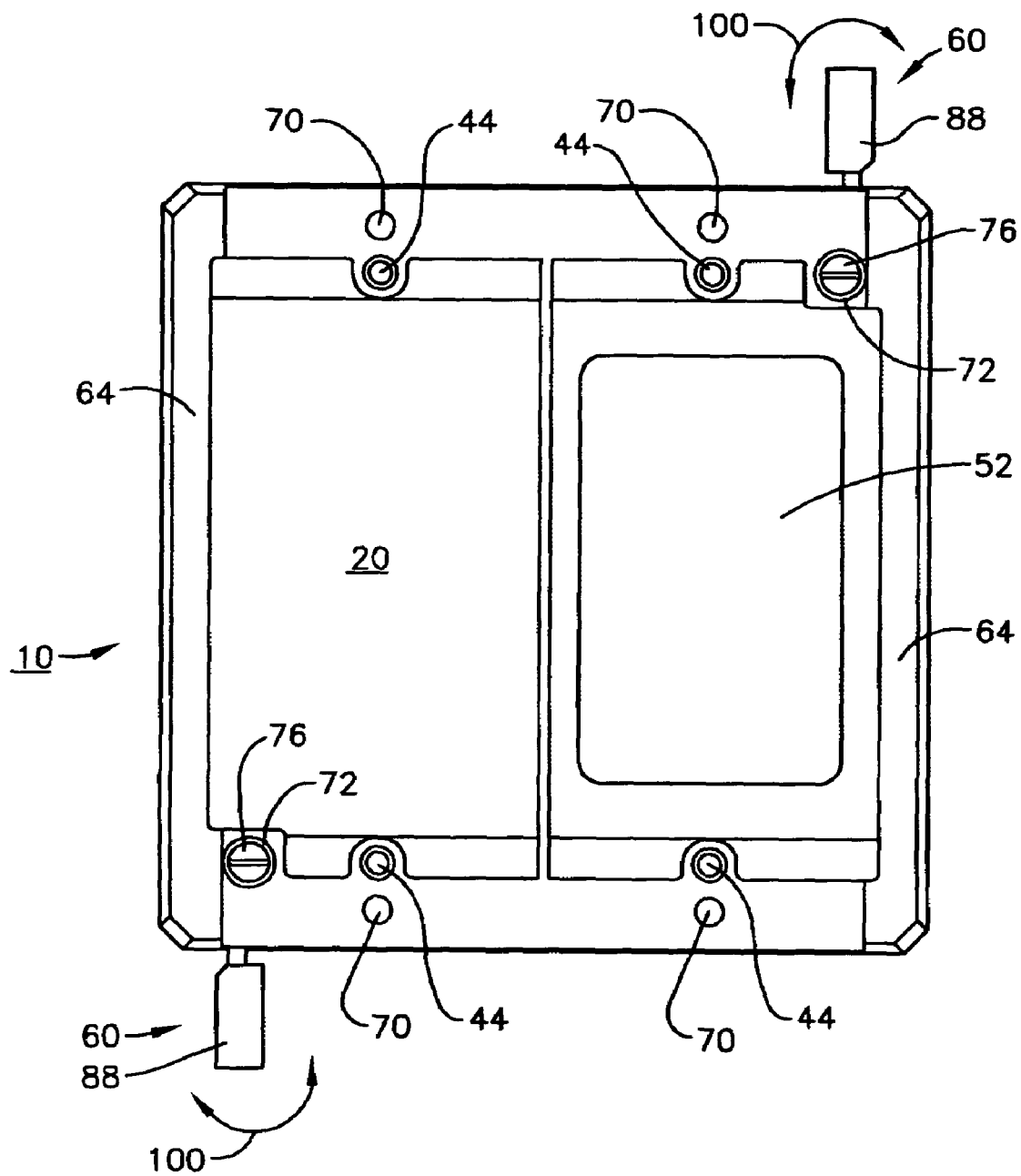
FIG. 7 is a front plan view of the electrical box of FIG. 5 with flags extended.
Figure 8:
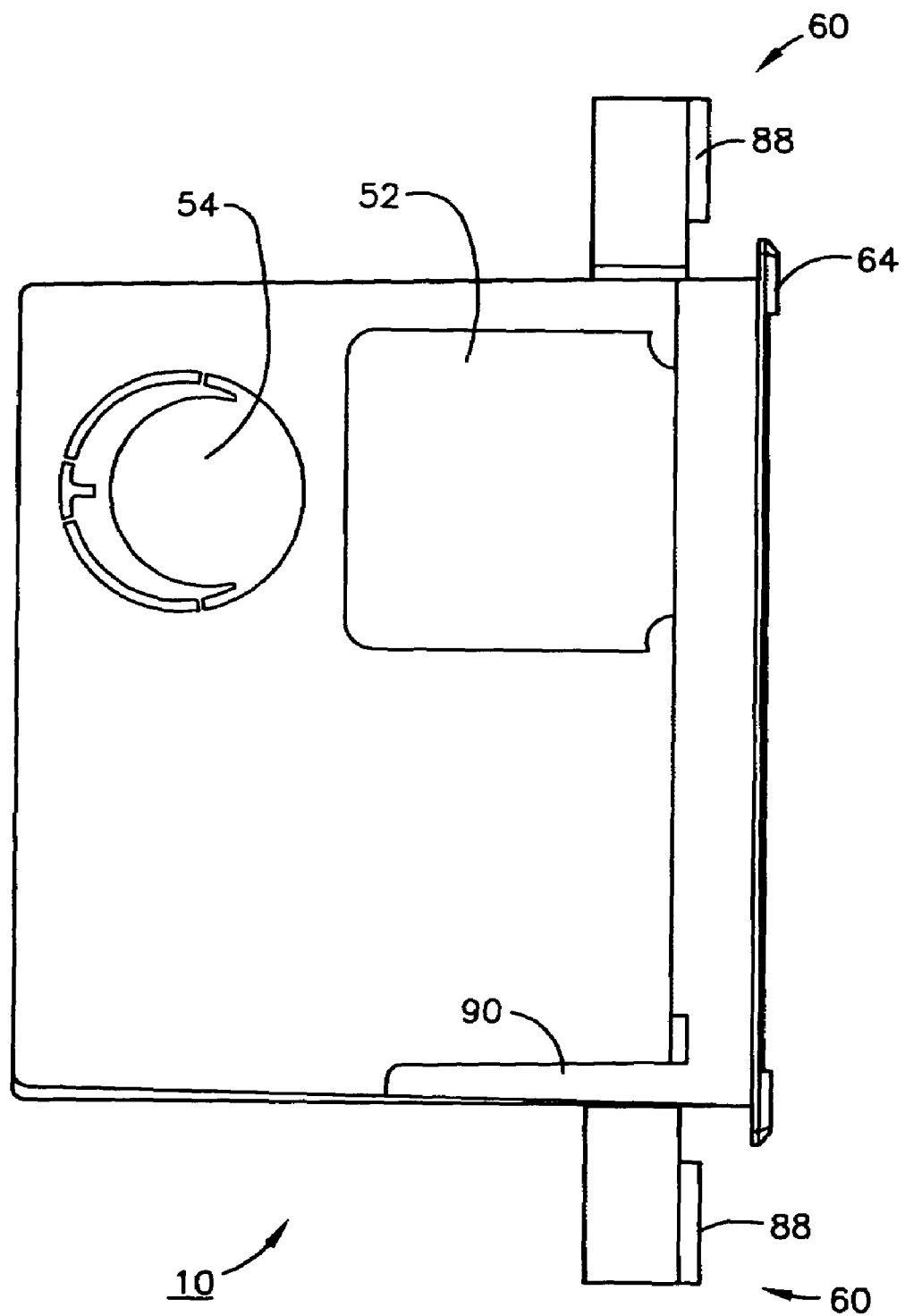
FIG. 8 is a rear plan view of the electrical box of FIG. 5.
Figure 9:
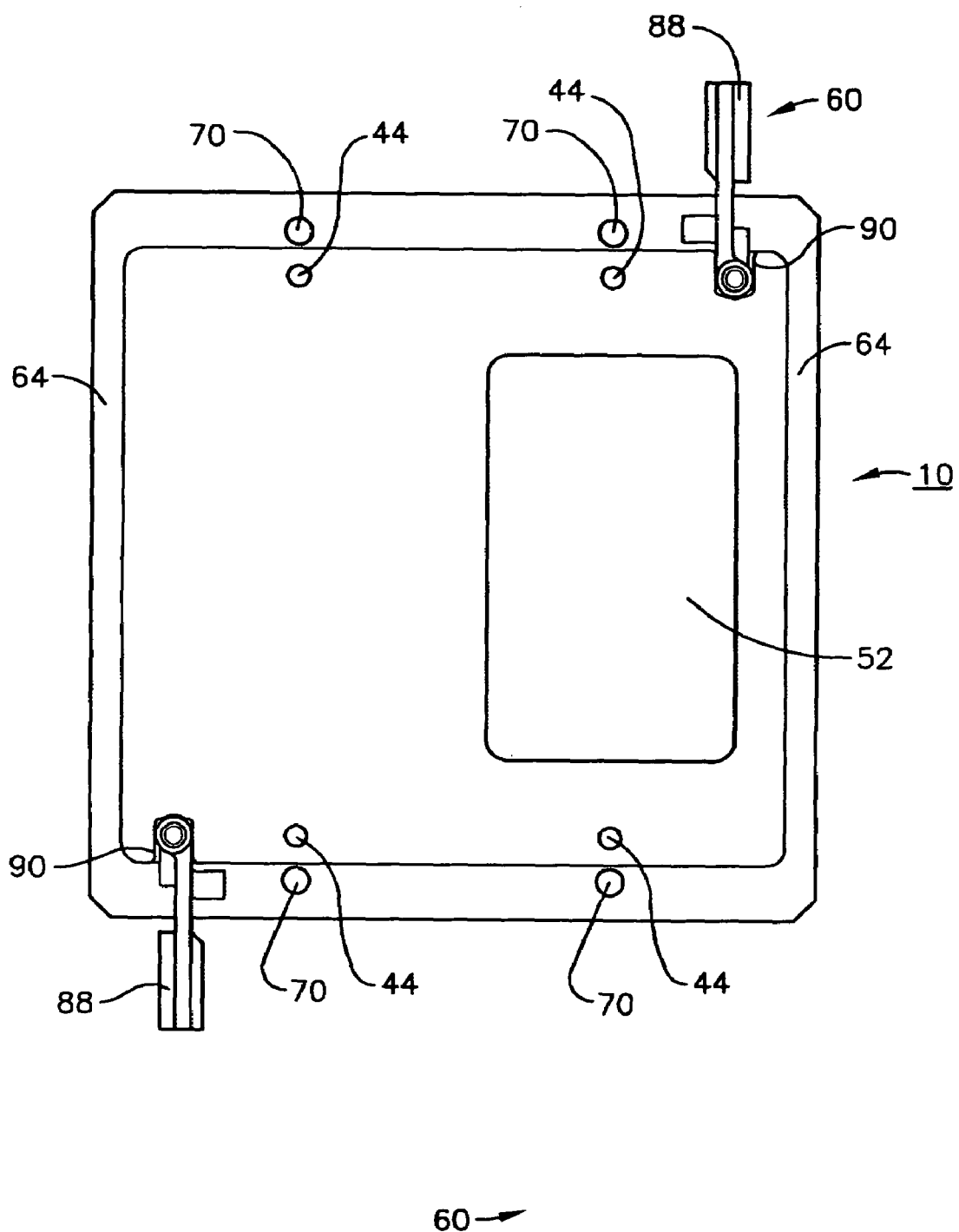
FIG. 9 is a side view of FIG. 8.

As shown in FIG. 6 that depicts an exploded perspective view of integral box 10 in a wall, completely assembled and installed in a wall as an "old work"installation, integral box 10 is inserted into a rectangular opening in wall 74 screws 76 that engage flags 60 as described hereinafter are turned causing flange 64 to bear directly against wall 74, low voltage and high voltage outlets 66 and 68 are mounted to integral box 10 by tightening of screws 78 that engage mounting blocks 44 and face plate 55 is applied over front opening 22 by the tightening of screws 80 that engage screw mounting apertures 70.

While a complete and detailed description of flags 60 and their related elements is contained in U.S. Pat. No. 6,093,890 which is incorporated herein by reference in its entirety, a further description of flags 60 and related structure follows. Within opposing diagonal corner-located mounting blocks 72 are turning screw holes 82 each of which contain turning screw 76 which freely rotates in screw holes 82 that are smooth and not threaded. The leading ends 84 of turning screws 76 are adjustably carried via turning screw holes 82 to flags 60. Each flag 60 has an aperture 86 that receives the leading ends 84 of turning screws 76 that are threaded therein with a friction fit.

After a rectangular hole has been cut in wall 74, integral box 10 is inserted therein and turning screws 76 turned clockwise (given that turning screws 76 are right handed screws) to flip flags 60 into position, i.e. away from the body of integral box 10. As turning screws 76 continue to turn, they draw the pads 88 to the inside surface of wall 74 to hold integral box 10 firmly in position. Integral box 10 also includes a flanges 90 that extend parallel to the depth of integral box 10. Flanges 90 serve to prohibit flag 60 from turning beyond the outside edge of integral box 10 thereby allowing for further tightening of turning screws 76 beyond engagement with apertures 86 and rotation of flags 60 to frictionally drive into apertures 82 thereby drawing flags 60 into contact with the rear surface of wall 74, while the rear surface of peripheral flange 64 engages the front surface of wall 74. As will be apparent to the skilled artisan, when flags 60 are in their retracted or unextended/turned position depicted in the various Figures, they rotate to a position within the boundaries of flange 64 thus making electrical box 10 readily insertable into a rectangular opening in wall 74 as described above. Such movement is best understood by viewing FIG. 7 wherein the movement of flags 60 is indicated by arrows 100.

Placement of mounting blocks 72 at the opposing diagonal corners of integral box 10 provides a secure fastening of integral box 10 to wall 74 during subsequent installation of low and high voltage connections through apertures 52 and 54 respectively in the conventional fashion.

While the integral one-piece combined low voltage/high voltage electrical box of the present invention may be fabricated from a variety of materials, it is preferred that it be fabricated from a polymeric material that is relatively easily fabricated by, for example, compression molding while providing a product with excellent insulating properties.

There has thus been described an integral one-piece combined low voltage/high voltage electrical box that allows side by side installation of, for example, a standard receptacle and low voltage outlet(s) in either a new construction or an "old work" or retrofit application.

As the invention has been described, it will be apparent to those skilled in the art to which this invention applies that the same may be varied in many ways without departing from the spirit and scope of the invention. Any such modifications are intended to be included within the scope of the appended claims.

What is claimed is:

1. An integral, one-piece low voltage/high voltage electrical outlet box comprising:
  A) an integral one-piece structure including:
    i) a top,
    ii) a bottom,
    iii) opposing exterior side walls all defining an interior volume; and
    iv) a solid internal, integral dividing wall extending between the top and the bottom and defining low voltage having low voltage side, rear and exterior walls and receptacle and a high voltage side of said electrical box with an interior volume; knockouts or apertures for the insertion of electrical cables in the receptacle side;
  B) punchouts or openings in the top, bottom and exterior sidewall of the low voltage side for the insertion and securing of low voltage wiring/cables; and
  C) substantially rectangular apertures in said low voltage side, rear and exterior walls for the insertion and securing of low voltage wiring or cables, said substantially rectangular open apertures in said rear and exterior walls comprising a majority of the areas of said low voltage side rear and exterior walls and being defined by a framework comprised of portions of said low voltage side rear and exterior walls;
  D) a generally rectangular open face;
  E) a peripheral flange about said open face extending outward from said open face and adapted to extend around an opening in a wall;
  F) at least one pair of mounting blocks located inside of said open face and at opposing diagonal corners of said open face;
  G) turning screw holes located in each of said mounting blocks;
  H) a threaded screw having a leading end located in each of said turning screw holes; separate individual flags located adjacent to each of said mounting blocks and held in position by said leading end of said turning screws for tightening said peripheral flange to said wall; and I) a hole in each of said flags for receiving with a friction fit said leading end of said turning screw.

2. The integral, one-piece low voltage/high voltage electrical outlet box of claim 1 wherein the internal, integral dividing wall is located at or in the vicinity of the midpoint of the top and the bottom.

3. The integral, one-piece low voltage/high voltage electrical outlet box of claim 1 wherein said flags are free to fall within said peripheral flange prior to be being tightened.

* * * * *